Patented Apr. 10, 1934

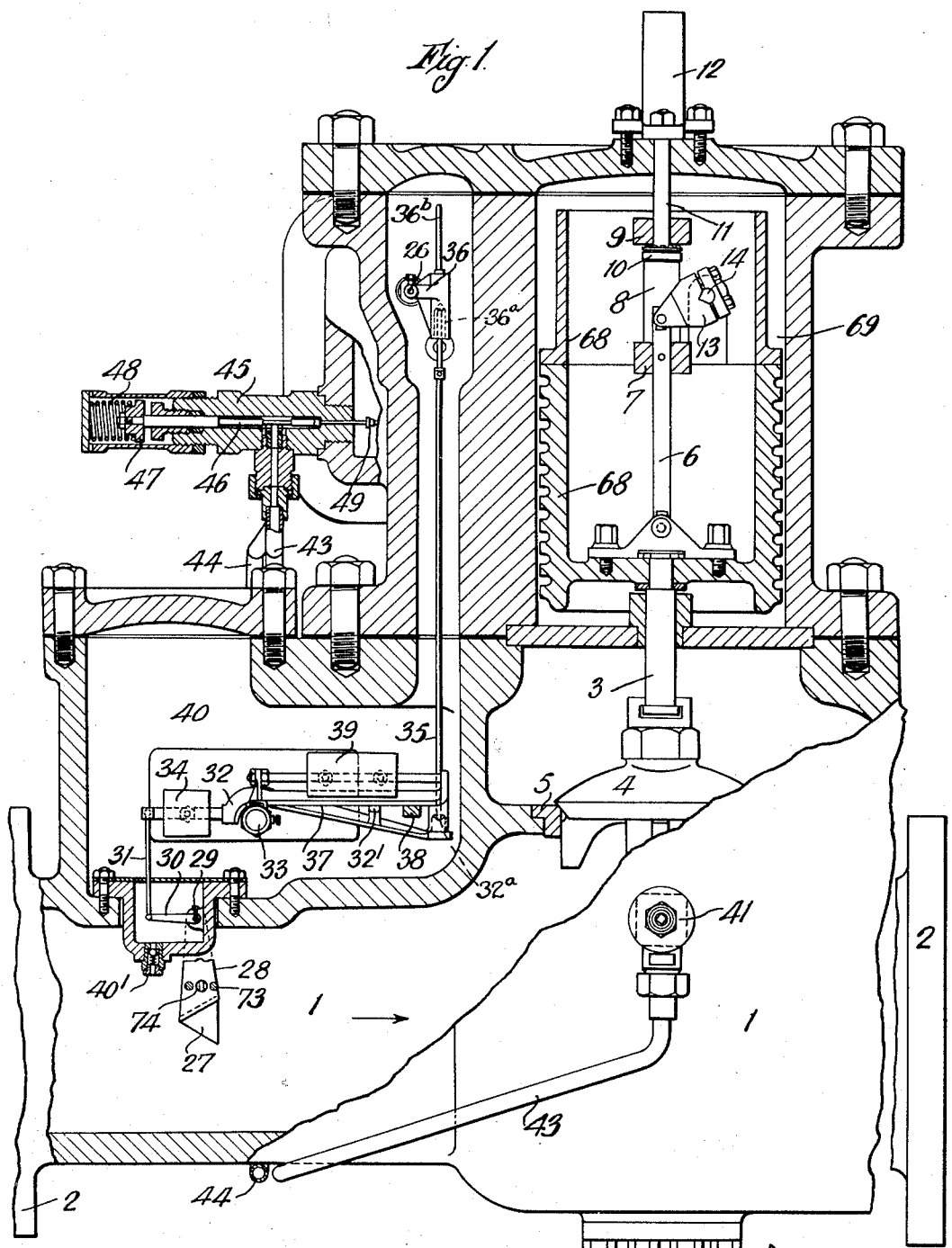

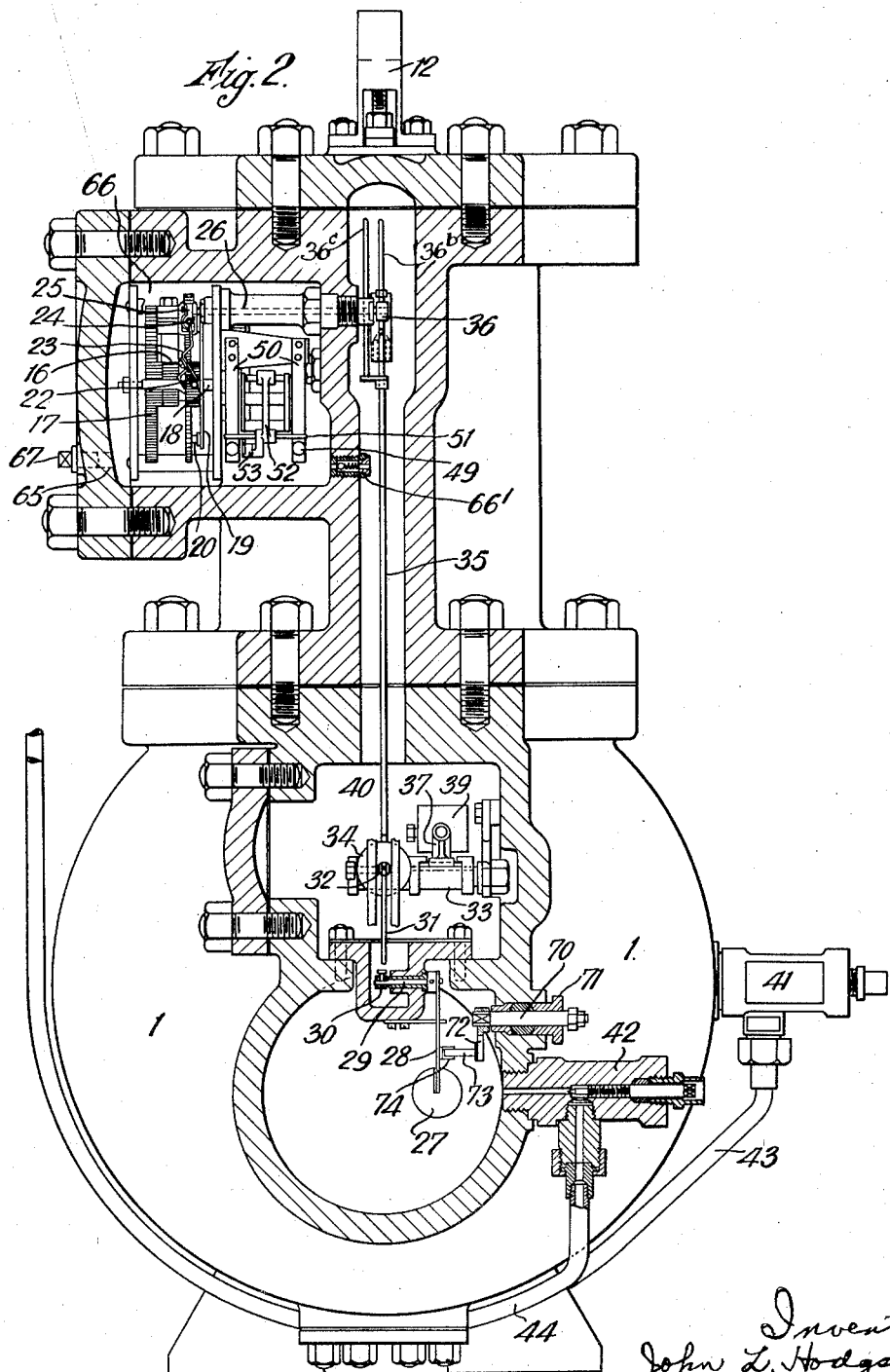

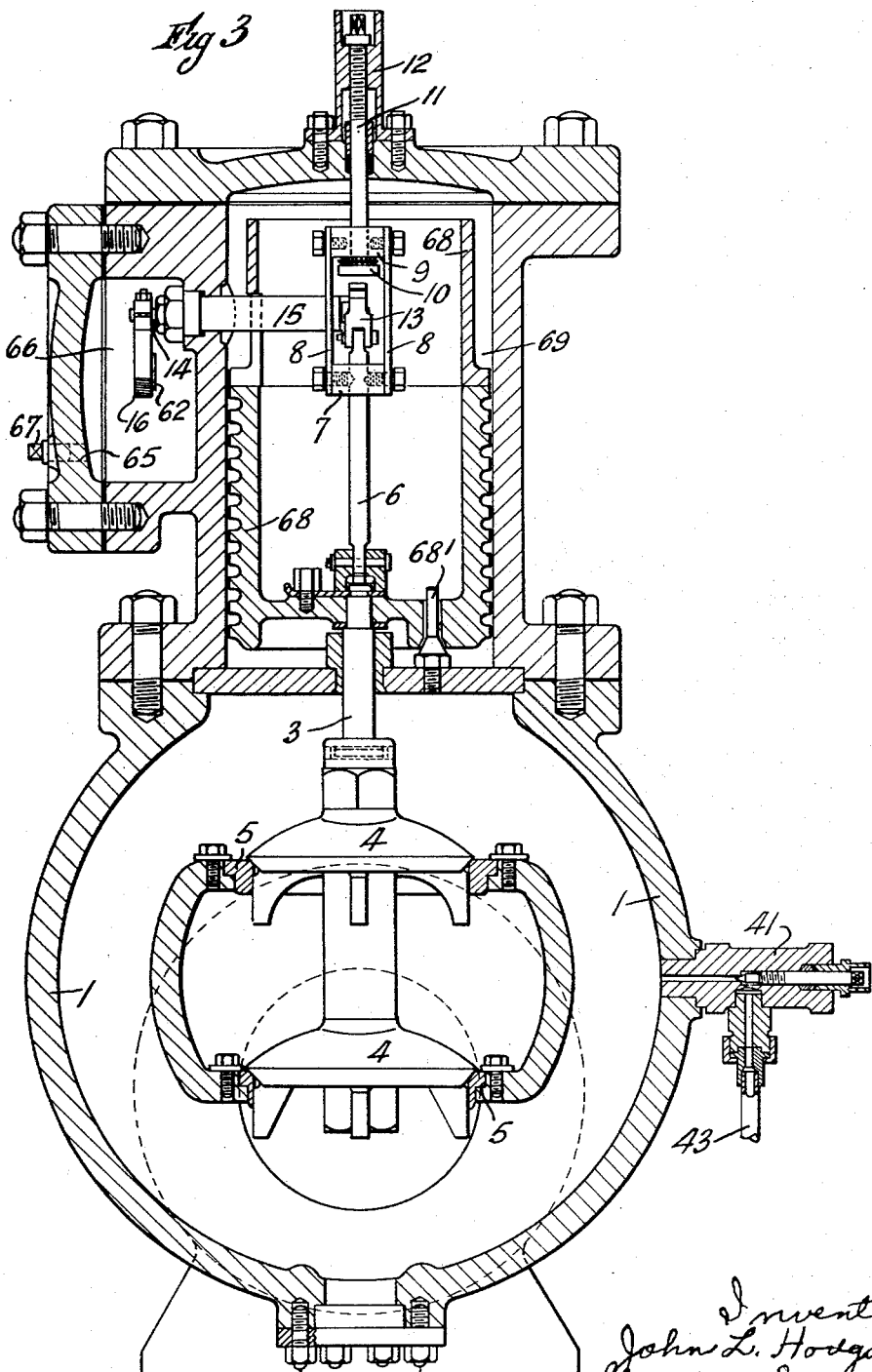

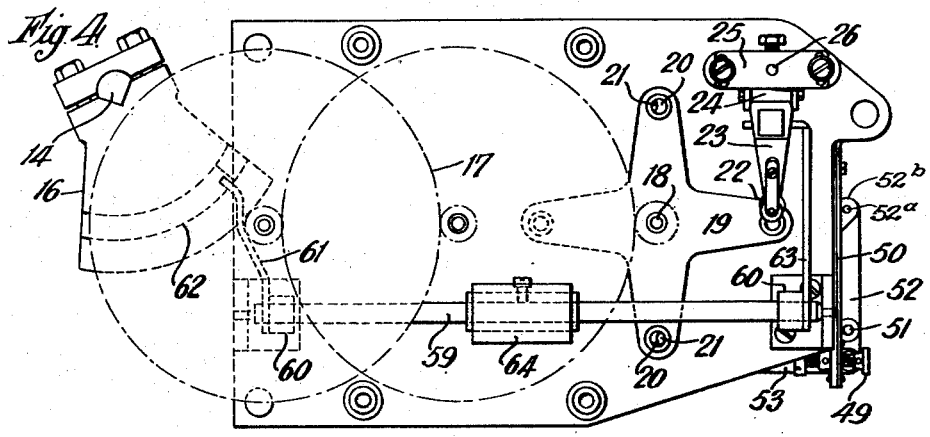

1,954,701

UNITED STATES PATENT OFFICE 1,954,701

CUT-OUT VALVE

John Lawrence Hodgson and ffolliott Gray, Luton, England, assignors to George Kent, Limited, London, England Application November 5, 1931, Serial No. 573,282

12 Claims. (Cl. 137—153)

This invention relates to cut-out valve apparatus.

One object of the present invention is to provide a pipe-line with valves which will automatically close should the rate of flow through the pipe-line rise above a predetermined rate as may be occasioned for example if a part of the pipe-line bursts.

In carrying out the invention, we provide the apparatus with means which are responsive to predetermined flows in either direction through the pipe-line and which actuate trip mechanism which allows the valve to close when the rate of flow in the normal direction increases above a predetermined amount, or when a reversal of flow occurs.

The means may comprise either a conical or cup-shaped movable obstruction in the pipe-line or a pressure measuring device which is responsive to differential pressures created by a venturi or other constriction in the pipe line: in either case the arrangement is such that a low velocity flow in the reverse direction produces approximately the same reaction on the trip mechanism as a high velocity flow in the normal direction. Preferably the trip mechanism is adjustable, as by weights or springs to operate at different predetermined maximum flows. The trip mechanism may operate on a star wheel which is driven by gearing for stepping up the movement of the valve. Normally the star wheel is prevented by the trip mechanism from turning, and, after the trip has been actuated, i. e., moved out of the path of the star wheel, it is held in this position while the valve is closed and can be re-set only when the valve is raised.

According to a further feature of the invention, means are provided for retarding the closing of the valve when the trip mechanism is actuated so that excessive pressures shall not be engendered in the pipe-line. This can be effected either by a dash pot or by a fan actuated by the step up gearing.

According to a further feature of the invention the trip mechanism can be manually operated for testing and other purposes.

According to a further feature of the invention we provide brake mechanism which automatically stops movement of the valve, after the mechanism has been tripped, whenever the pressure in the pipe-line exceeds a safe predetermined amount.

According to a further feature of the invention all the essential working parts except the obstruction are located in an oil-tight chamber, or chambers.

According to a further feature of the invention, manually operable means are provided for raising the valve to re-set it, after it has closed.

In the accompanying drawings which illustrate the invention, Figure 1 is a longitudinal section; Figures 2 and 3 are transverse sections through different planes; Figure 4 is a detail view on an enlarged scale of a detent mechanism; Figure 5 is a detail view also on an enlarged scale of a brake mechanism; Figure 6 shows a detailed view of a modification. Figure 7 is a diagrammatic view of a further modification.

1 is the main body of the valve; the body is provided at each end with a flange 2 to enable it to be inserted in a pipe-line. 3 is a rod having mounted thereon a balance valve 4 adapted to seat on seatings 5. The upper end of the rod 3 has connected thereto a second rod 6 extending slidably through and being guided by a crosshead 7 connected by a pair of side plates 8 to an upper crosshead 9. The upper crosshead is engaged by the head 10 of a screw threaded shaft 11 which can be rotated in a nut 12 fast on the body 1, and which is provided at its upper end with a square portion by means of which it can be rotated by a key.

The rod 6 is pivotally connected to a crank 13 mounted upon shaft 14, which latter is rotatably mounted in a sleeve 15 on the end of which is mounted a segment 16. The periphery of the segment is provided with teeth in mesh with gearing indicated at 17, the last wheel of the train being in mesh with a pinion fast on a spindle 18 to which a star wheel 19 is attached. Each arm of the star wheel is provided with a stud 20 having a recessed portion 21 adapted to be engaged by a roller 22 carried by an arm 23 which forms a detent and is pivotally mounted at 24 on a rocker 25 which itself is fast on a spindle 26.

Normally, when there is a proper rate and direction of flow through the valve body, the valve 4—4 will be in its upper open position, and the detent 23 will be in engagement with one of the studs 20 on the star wheel 19, thereby preventing rotation of the latter and the gearing 17, and preventing rocking of the segment 16 and lowering of the valve 4—4. Trip mechanism associated with the detent 23 is responsive to a departure from a proper rate or direction of flow for disengaging the detent roller 22 from the star wheel stud so as to permit the valve 4—4 to be moved to its lower and closed position by bias means to be described later.

Referring now to the trip mechanism for operating the detent 23, a cone or cup-shaped member 27 is mounted on arm 28, which is mounted on a spindle 29, the cone forming a movable obstruction. The spindle 29 has a crank 30, pivotally connected to which is one end of a link 31, the other end of the link being pivotally connected to one end of an arm 32, which is mounted for rocking movements on a shaft 33. 34 is a weight slidably mounted on that end of the arm 32 which is connected to the crank 30. The other end of the arm is provided with a cup-shaped depression 32ª which receives the lower end of a rod 35, the upper end of which fits loosely within a recess 36ª in a crank 36 mounted upon the spindle 26 and bears against the root of the recess 36ª. A rod 36ᵇ fixed to the crank 36 is provided for permitting the crank's being held stationary when it is desired to move the rod 35 out of the recess 32ª, a rod 36ᶜ being attached to the rod 35 and extending upwardly alongside of the latter so as to be accessible from above when the casing cover is removed. 37 is an arm which is rotatably supported by the shaft 33, downward movement of the said arm being limited by a fixed stop 38. Slidably mounted on the arm 37 is a weight 39. The arm 37 is adapted to be engaged by a projection 32' on the arm 32. The arms 32, 37, weights 34, 39 and rod 35 are contained in a separate chamber 40 within the main valve chamber 1. 40' is a non-return valve.

The crank 36 is sufficiently heavy to cause it to rock in a clockwise direction under the action of gravity when the rod 35 is permitted to move downwardly by clockwise rocking movement of the arm 32. Thus, if the arm 32 is rocked in a counter clockwise direction, the rod 35 is lifted positively, and the upper end of the rod bears against the root of the recess 36ª and rocks the crank 36 in a counter clockwise direction; whereas, if the arm 32 is rocked in a clockwise direction, the rod 35 is lowered and the weight of the crank 36 causes it to rock in a clockwise direction. In either case, rocking of the crank 36 results in rocking of the shaft 26, thereby causing the detent roller 22 to move out of engagement with the associated stud 20 on the star wheel 19.

In the upstream and downstream sides of the valve chamber are two shut-off valves 41—42 provided, respectively, with small pipes 43—44 each adapted to convey the pressure therein respectively to one of a pair of governor chambers 45 (only one being shown). Mounted in each of the governor chambers is a piston 46 (only one being shown), one end of each piston being provided with a head 47 bearing against a spring 48 adapted to resist movement of the associated piston under the urge of pressure within the governor chamber. The other ends of the pistons 46 bear respectively against one of a pair of adjustable tappets 49 mounted respectively on the ends of a pair of springs 50 (only one being shown). Bearing against the faces of the springs 50 is a rod 51 carried by a link 52 pivoted as at 52ª to a fixed arm or bracket member 52ᵇ and pivoted at its lower end to a lever 53 pivotally connected to the end of an arm 54 pivoted at 55 and provided with a brake lining 56, which latter is adapted to engage a brake drum 57 mounted on the spindle 18. 58 is a draw off spring. Each spring 50 tends to push the rod 51 into operative position so as to apply the brake 53 on the brake drum 54. If the pressure acting through either of the valves 41—42 rises above a predetermined value, the corresponding piston 46 will be moved to the left (as viewed in Figure 1) against the action of the associated spring 48, and thus will allow the corresponding spring 50 to move the rod 51 in a clockwise direction (Figure 5) against the urge of the spring 58, which is not strong enough to hold the brake arm 54 released when either of the springs 50 is released by the associated piston 46. Thus, when either of the pistons 46 is moved to the left, the associated spring 50 will be permitted to rock the link 52 to the left so as to set the brake. 59 is a spindle which is rotatably mounted in bearings 60 and is provided at one end with an arm 61 adapted to engage a cam track 62 on the segment 16; the other end of the spindle is provided with an arm 63 adapted to engage the rear face of the detent arm 23 and swing the roller 22 at the end thereof out of the path of the studs 20 on the star wheel 19. 64 is a weight fast on the spindle 59 which maintains the arm 61 in contact with the cam track 62. In operation, as soon as the star wheel is released so as to permit operation of the gearing 17, the segment 16 will rock in a counter clockwise direction as viewed in Figure 4. Soon after the segment 16 begins to move, the rise in the cam track 62 acts upon the arm 61 to rock the shaft 59 so as to cause the arm 63 on the shaft to engage the rear face of the detent arm 23 and swing the latter out of the path of the star wheel studs 20, thereby preventing the studs from striking the detent roller 22 in case the shaft 26 should be returned to its normal position before the valve has closed completely. 65 is a passage communicating with the chamber 66 in which the segment and gearing and brake gears are housed. The outer end of the passage is normally closed by a screw threaded plug 67. If the plug be removed, a hand pump can be inserted in its place in order to force oil into the chamber. 66' is a non-return valve in the chamber 66.

The valve rod 3 is provided at its upper end with weights 68 mounted in a chamber 69 which is preferably filled with oil.

In operation, the weights 34, 39 are so arranged that when fluid is passing through the valve 1 at the normal rate of flow, the arms 32, 37 are in the position shown in Figure 1. If the main bursts on the upstream side of the valve and there is reverse flow through it, the conical obstruction will move to the left (in Figure 1) thereby raising the weight 34 mounted on the arm 32, the outer end of which will lower the rod 35 and permit the crank 36 to rock in a clockwise direction thereby moving the roller 22 on the detent 23 out of the path of that stud 20 on the star wheel 19 with which it is in engagement.

If the main bursts on the downstream side of the valve, the cone will move to the right in Figure 1, whereby the arm 32 is rocked in the opposite direction, thus raising the weight 39 on the arm 37 through the projection 32', the weight 24 being at the same time lowered. The outer end of the arm 32 will raise the rod 35 and rock the crank 36, thereby moving the roller 22 out of engagement with the stud 20.

The conical obstruction will produce approximately the same reaction on the trip mechanism for a low velocity flow in the reverse direction as it will produce for a high velocity flow in the normal direction.

The weights 68 cause the valve 4 to descend thereby rocking the segment 16 through the crank 13, the segment driving the gear train and so the star wheel 19 at a considerable mechanical disadvantage, so as to ensure small forces on the studs 20 when they are engaged again by the roller 22. As soon as the segment begins to move, the cam 62 engages the arm 61 on the spindle 59 and the arm 63 at the other end of the spindle rocks the detent arm 23 which is pivoted about the axis 24 so that the roller 22 is moved out of the plane of the studs 20 on the star wheel 19. If the valve 4 shuts so quickly as to result in an undesirable increase in pressure in the pipe-line and valve, the pressure is communicated through the shut-off valve 42 and the pipe 44 to the corresponding chamber 45, thereby moving the piston 46 against the action of the spring 48, and allowing the lever 53 to be moved by the spring 50 so as to move the brake shoe 56 on to the brake drum 57, thereby stopping the star wheel from rotating, and thereby keeping the valve stationary.

As soon as the pressure returns to approximately the allowed maximum value, the pressure of the spring 48 moves the piston 46 to its normal position and the brake is thereby released, thus allowing the star wheel to rotate and consequently the segment to rock and the valve to be lowered a little further.

Any too great increase of pressure on the downstream side of the valve will operate the other governor chamber 45 to retard the descent of the valve 4 in a similar manner.

In order to be able to test the apparatus to see that the valve will freely close when the mechanism is tripped by an alteration in the rate of flow through the valve, the spindle 70 is provided, which is rotatably mounted in a bush 71. The inner end of the spindle is provided with a crank 72 having a fork 73 adapted to engage a pin 74 on the arm 28 carrying the cone. The outer end of the spindle has a square end, to enable it to be turned by a key. It will be seen that by this means the arm can be rocked in either direction to trip the mechanism.

In order to re-set the valve, the shaft 11 is rotated by a key (not shown) applied to the squared end thereof, whereby the valve 4 and weights 68 are raised, the segment 16 rocked, and the trip mechanism re-set; the shaft 11 is then lowered by rotating it in the opposite direction so as not to prevent the descent of the valve when it is again tripped.

If desired the brake mechanism controlling the descent of the valve may be replaced by a dash pot which automatically checks the descent of the valve. The dash pot may be conveniently be formed by the weights 68 and the chamber 69 in which they are mounted which latter would contain oil or other suitable fluid, the arrangement being such that the descent of the valve would be controlled so as to prevent excessive rise in pressure in the pipe-line due to the closing of the valve. As the valve may move a very considerable extent towards its closed position without causing any substantial rise in pressure, the dash pot may be arranged so that the valve is allowed at first to descend comparatively rapidly and then at a decreasing rate: an arrangement for effecting this is indicated in Figure 3 in which a rod 68' having a cylindrical portion and a conical portion extends into an aperture in the lower weight 68 which is correspondingly shaped, the cylindrical portion normally acting as a steady pin.

During the first part of the descent of the valve the effective area of the opening is controlled by the cylindrical portion of the rod 68' and allows the valve to descend comparatively rapidly. The conical portion of the aperture then commences to co-operate with the conical portion of the rod 65 and progressively reduces the effective area through which fluid can pass and thus effects a decrease in the rate of descent of the valve.

In the modification shown in Figure 6, the cone 27 is similarly carried on an arm 28 mounted on a spindle 29 carrying a crank 30, the outer end of which, instead of being connected to the arm 32, is connected by a link 75 to one arm of a bell crank lever 76, pivotally mounted at 77. The other end of the bell crank lever is provided at its end with a roller 78 adapted to engage one of the studs 20 on the star wheel 19 and is provided with a pair of independent arms 79 having claws, each adapted to engage a stud 80 carried on a pair of arms 81 pivotally mounted at 82; each arm is provided with a spring 83 which pulls the arms 81 against adjustable stops 84.

In operation, if the normal rate of flow through the valve increases above the predetermined amount, or if a reversal of flow occurs, the cone, acting on the link 75 rocks the bell crank lever 76 against the action of one or other of the springs 83, and moves the roller 78 out of the path of the stud 20, thereby allowing the valve to fall as in the previous arrangement.

It will be seen that by adjusting the tension of the springs 83, the rate of flow at which the tripping is effected can be regulated.

In the further modification shown in Figure 7, the spindle 85 carrying the detent 23 is provided with an arm 86 connected by a link 87 to a float 88 contained in one of a pair of chambers 89 which are connected at their lower ends to form a U tube, one of the chambers being connected to the upstream side of a venturi 90, while the other chamber is connected to the downstream side of the venturi. The venturi should have the form illustrated in the drawings. This form will have a co-efficient discharge of about approximately "unity" in the normal direction and a co-efficient discharge of approximately .6 in the reverse direction, so that a much lower flow in the reverse direction will produce the same differential pressure as the high flow in the normal direction. In this construction the detent is, as in the former case, rocked when the rate of flow increases above the predetermined amount, or if a reversal of flow occurs, and the arrangement possesses the advantage that there are no moving parts in the pipe line.

What we claim is:—

1. In cut-out valve mechanism for fluids the combination of a valve chamber through which the fluid flows, a valve, means for biasing the valve to move into its closed position, means for normally holding the valve in its open position, means for rendering the holding means inoperative to release the valve, means which are responsive to a substantially equal extent to a large flow in the normal direction and a small flow in the reverse direction and are in connection with the means for rendering the valve holding means inoperative to release the valve when a predetermined flow is exceeded, and means responsive to pressure in the valve chamber for limiting the rate of movement of the valve into its closed position so that a safe pressure in the fluid flow main is never exceeded.

2. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, means responsive to fluid flow and in connection with the trip mechanism to release the valve when a predetermined flow is exceeded, reduction gearing interposed between the valve and the detent mechanism, and means for controlling the rate of movement of the valve into its closed position so that a safe pressure in the fluid flow main is never exceeded comprising a fan operated by the reduction gear.

3. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, means which are responsive to a substantially equal extent to a large flow in the normal direction and a small flow in the reverse direction and are in connection with the trip mechanism to release the valve when a predetermined flow is exceeded, reduction gearing interposed between the valve and the detent mechanism, and means for controlling the rate of movement of the valve into its closed position so that a safe pressure in the fluid flow main is never exceeded comprising a fan operated by the reduction gear.

4. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, means which are responsive to a substantially equal extent to a large flow in the normal direction and a small flow in the reverse direction and are in connection with the trip mechanism to release the valve when a predetermined flow is exceeded, and means for controlling the rate of movement of the valve into its closed position so that a safe pressure in the fluid flow main is never exceeded comprising a dash pot moved by the movement of the valve into closing position.

5. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, a movable conical or cup-shaped obstruction which responds to a substantially equal extent to a large flow in the normal direction and a small flow in the reverse direction, connections between the trip mechanism and the obstruction, and means for controlling the rate of movement of the valve into its closed position so that a safe pressure in the fluid flow main is never exceeded.

6. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, a venturi so shaped as to create substantially equal differential pressures for a large flow in the normal direction and a small flow in the reverse direction, a device responsive to the differential pressure, connections between the trip mechanism and the device, and means for controlling the rate of movement of the valve into its closed position so that a safe pressure in the fluid flow main is never exceeded.

7. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, means responsive to fluid flow and in connection with the trip mechanism to release the valve when a predetermined flow is exceeded, reduction gearing interposed between the valve and the detent mechanism, and means for controlling the rate of movement of the valve into its closed position so that a safe pressure in the fluid flow main is never exceeded.

8. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, means responsive to fluid flow and in connection with the trip mechanism to release the valve when a predetermined flow is exceeded, means connected to said trip mechanism and extending through said casing for manually actuating the trip mechanism from outside the casing, and means connected to said valve and extending through said casing for resetting the valve from outside the chamber.

9. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, a movable conical or cup-shaped obstruction which responds to a substantially equal extent to a large flow in the normal direction and a small flow in the reverse direction, connections between the trip mechanism and the obstruction, reduction gearing interposed between the valve and the detent mechanism, adjusting means for enabling the detent mechanism to be released at different predetermined maximum flows, and means for controlling the rate of movement of the valve into its closed position so that a safe pressure in the fluid flow main is never exceeded.

10. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, means responsive to fluid flow and in connection with the trip mechanism to release the valve when a predetermined flow is exceeded, reduction gearing interposed between the valve and the detent mechanism, adjusting means for enabling the detent mechanism to be released at different predetermined maximum flows, means for holding the detent mechanism in its inoperative position after the valve has been released, and means for controlling the rate of movement of the valve into its closed position so that a safe pressure in the fluid flow main is never exceeded.

11. In cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, means responsive to fluid flow and in connection with the trip mechanism to release the valve when a predetermined flow is exceeded, means for controlling the rate of movement of the valve into its closed position so that a safe pressure in the fluid flow main is never exceeded, working chambers for the operating parts which are filled with suitable liquid, and means for introducing the liquid while the valve is under pressure.

12. In a cut-out valve mechanism for fluids the combination of a valve chamber through which the fluid flows, a valve, means for biasing the valve to move into its closed position, detent mechanism for normally holding the valve in its open position, trip mechanism for rendering the detent mechanism inoperative to release the valve, a movable conical or cup-shaped obstruction which responds to a substantially equal extent to a large flow in the normal direction and a small flow in the reverse direction, connections between the trip mechanism and the obstruction, reduction gearing interposed between the valve and the detent mechanism, adjusting means for enabling the detent mechanism to be released at different predetermined maximum flows, and means for controlling the rate of movement of the valve into its closed position so that a safe pressure in the fluid flow main is never exceeded.

JOHN LAWRENCE HODGSON.
FFOLLIOTT GRAY.